US012780613B2

(12) United States Patent
Cui

(10) Patent No.: US 12,780,613 B2
(45) Date of Patent: Nov. 3, 2026

(54) ROLLER ARRANGEMENT FOR A HANDRAIL GUIDE PROFILE OF AN ESCALATOR OR A MOVING WALKWAY

(71) Applicant: Inventio AG, Hergiswil (CH)

(72) Inventor: Henry Cui, Shanghai (CN)

(73) Assignee: Inventio AG, Hergiswil (CH)

( * ) Notice: Subject to any disclaimer, the term of this patent is extended or adjusted under 35 U.S.C. 154(b) by 49 days.

(21) Appl. No.: 18/992,432

(22) PCT Filed: Aug. 3, 2023

(86) PCT No.: PCT/EP2023/071566
§ 371 (c)(1),
(2) Date: Jan. 8, 2025

(87) PCT Pub. No.: WO2024/046701
PCT Pub. Date: Mar. 7, 2024

(65) Prior Publication Data

US 2025/0389297 A1 Dec. 25, 2025

(30) Foreign Application Priority Data

Aug. 30, 2022 (EP) .................................... 22192708

(51) Int. Cl.
*B66B 23/24* (2006.01)
*B66B 23/22* (2006.01)

(52) U.S. Cl.
CPC .............. *B66B 23/24* (2013.01); *B66B 23/22* (2013.01)

(58) Field of Classification Search
CPC ................................ B66B 23/22; B66B 23/24
See application file for complete search history.

(56) References Cited

U.S. PATENT DOCUMENTS 2,879,881 A * 3/1959 Tilton ..................... B66B 23/24
198/337
2,919,786 A * 1/1960 Tilton ..................... B66B 23/24
198/337

(Continued)

FOREIGN PATENT DOCUMENTS

DE 29500800 U1 3/1995
DE 19861072 A1 2/2000

(Continued)

OTHER PUBLICATIONS

International Search Report issued in application No. PCT/EP2023/071566 on Oct. 6, 2023.

*Primary Examiner* — Gene O Crawford
*Assistant Examiner* — Keith R Campbell
(74) *Attorney, Agent, or Firm* — Knobbe Martens Olson & Bear LLP

(57) ABSTRACT

The disclosure relates to a roller arrangement which can be embedded in a groove of a handrail guide profile of an escalator or a moving walkway. The roller arrangement comprises a bearing block and a roller with at least one roller axle, wherein the roller is mounted rotatably in the bearing block with the roller axle. In addition, the roller arrangement has at least one locking element and a clamping element, which are arranged interacting with one another on the bearing block in such a way that, when a roller arrangement is embedded in the groove, the locking element can be braced with the clamping element between mutually opposed walls of the groove.

20 Claims, 2 Drawing Sheets

(56) References Cited

U.S. PATENT DOCUMENTS

| | | | | | |
|---|---|---|---|---|---|
| 3,321,059 | A * | 5/1967 | Kroepel | B66B 23/22 256/24 |
| 3,595,364 | A * | 7/1971 | Schoneweiss | B66B 23/22 198/335 |
| 5,477,954 | A * | 12/1995 | Greutter | B66B 23/22 198/335 |
| 5,634,546 | A * | 6/1997 | Ostermeier | B66B 23/22 198/335 |
| 2012/0279827 | A1 | 11/2012 | Ge et al. | |

FOREIGN PATENT DOCUMENTS

| | | | | |
|---|---|---|---|---|
| EP | 0575158 | A1 | 12/1993 | |
| EP | 3587335 | A2 | 1/2020 | |
| EP | 3587335 | A3 | 12/2021 | |
| WO | WO-0001606 | A1 * | 1/2000 | B66B 23/22 |

* cited by examiner

ROLLER ARRANGEMENT FOR A HANDRAIL GUIDE PROFILE OF AN ESCALATOR OR A MOVING WALKWAY

TECHNICAL FIELD

The present disclosure relates to a roller arrangement for a handrail guide profile, a handrail guide profile with a roller arrangement, and an escalator or moving walkway with such a handrail guide profile.

SUMMARY

Escalators and moving walkways have circumferential handrails on their balustrades that move synchronously with the escalator's step band or pallet band of the moving walkway. These handrails are usually wire-strand reinforced profile belts made of elastomer material and are guided by handrail guide profiles, often also referred to as handrail guide rails. The handrail guide profiles are usually sheet metal profiles made of steel or stainless steel or extruded profiles made of polymer material or aluminum, which have an approximately hat-shaped cross-section. As a rule, the handrail guide profiles are not provided with a wear-reducing, low-friction structure. This means that the handrail is in direct contact with the handrail guide profile. If escalators and moving walkways are used outdoors, rainwater can get between the handrail guide profiles and the handrails. This leads to a changing frictional resistance, which can cause the handrail to have jerky movements during operation. These not only cause an uncomfortable ride for users, but also harbor some hidden dangers and can even cause a monitoring sensor to respond and stop the escalator or moving walkway.

In order to reduce frictional resistance when the handrail is heavily deflected, DE 29500800 U1, for example, suggests using rollers instead of handrail guide profiles in these areas. EP 3 587 335 A2 discloses a roller arrangement with several rollers that are mounted in the handrail guide profile by means of a metal strip and mounting screws. The handrail guide profiles are provided with fastening holes on site, which means a considerable amount of assembly effort. In addition, the individual metal strips must be cut to fit the areas to be fitted with rollers.

The object of the present disclosure can be to minimize the assembly effort of rollers in the handrail guide profiles and can be to make them more flexible.

This object can be achieved by a roller arrangement which can be suitable for being embedded in a groove of a handrail guide profile of an escalator or moving walkway. Specifically, this means that the dimensions of the roller arrangement can be such that it can be inserted into the groove and mounted in it. The roller arrangement can comprise a bearing block and a roller with at least one roller axle. The roller can be rotatably mounted in the bearing block with the roller axle. In addition, the roller arrangement can comprise at least one locking element and one clamping element, which can be arranged interacting with one another on the bearing block in such a manner that, when the roller arrangement is inserted into the groove, the locking element can be clamped between opposing walls of the groove with the clamping element.

In other words, the roller arrangement can comprise a locking element which can be brought by the clamping element from an unclamped position, in which the roller arrangement can be easily inserted into the groove, to a clamped position, in which the roller arrangement can no longer be removed from the groove. This may mean that no modifications to the handrail guide profiles may be required in order to mount a roller arrangement securely and permanently. This roller arrangement can also be extremely flexible to use, as individual rollers can be mounted in the groove of the handrail guide profile at freely selectable distances from one another, rather than having to insert an entire band of rollers. This can save considerable assembly effort and material costs, as a roller arrangement may be fitted where a corresponding support may be required.

The locking element and the clamping element can have very different designs. Screw connections, for example, can be used as a clamping element. Of course, lever arrangements such as toggle levers or eccentric arrangements can also be used to apply a clamping force to the locking element. Preferably, the clamping element can comprise a threaded bolt and a threaded nut.

In a first embodiment of the roller arrangement, the locking element can be a curved leaf spring element. A support surface can be formed on the bearing block, on which the locking element is arranged. The curvature of the leaf spring element can span the support surface. The clamping element can be used to variably flatten the curvature of the locking element on the support surface, thereby changing its lateral expansion or width. This change in width can be used in such a manner that the clamping element can be clamped between opposite walls of the groove. Depending on the design of the locking element and the force applied by the clamping element, the roller arrangement can be mounted in the groove in a force-fit (frictional connection) and/or a form-fit (notch formation on the walls of the groove).

In a second embodiment of the roller arrangement, the locking element can be designed as a wedge element. In addition, a wedge surface can be formed on the bearing block, on which the locking element can be arranged for linear displacement. Due to the shape of the wedge surface and wedge element, the wedge element can be displaced orthogonally to the direction of the clamping force and relative to the bearing block as a result of a clamping force of the clamping element, in analogy to the leaf spring element described above. This can also change the width of the roller arrangement until the wedge element on the one hand and the contours of the bearing block on the other may be in contact with the opposite walls of the groove. The clamping force acting on the walls may depend on the reduction ratio of the wedge element, or more precisely on its wedge angle.

The third embodiment of the locking element may be very similar to the second embodiment, wherein the locking element can comprise two wedges. A support surface can be formed on the bearing block, on which the two wedges are arranged so that they can slide linearly and complement one another in terms of inclination. Functionally, the third embodiment can differ from the second embodiment only in that both wedges can be moved relative to one another and to the support surface.

In order to achieve an even more secure mounting or anchoring of the roller arrangement in the handrail guide profile, the areas of the locking element intended for contact with the walls of the groove can have an embossed edge.

In principle, the clamping element and/or the locking element can be designed in such a manner that once a locking element has been clamped between the walls of the groove, it can no longer be released. For this purpose, the clamping element and/or the locking element can have interlocking structures, plastically deformable areas, latching elements or securing elements such as anaerobic adhesives, securing elements and similar.

The bearing block of the roller arrangement can comprise two side cheeks with receptacles for the roller axle. The two side cheeks can be connected to one another by a base structure of the bearing block, such that the bearing block may have a U-shaped cross-section formed by the side cheeks and the base structure. The locking element and at least one clamping element associated with the locking element can be arranged on the floor structure, for example.

To enable the rollers to be changed without having to remove the bearing block from the groove in the handrail guide profile, the receptacles formed in the side cheeks can preferably be designed as U-shaped recesses. Their open areas can be oriented in a direction away from the base structure. The roller axle can be inserted into these receptacles. The handrail guided over the rollers can secure the roller axle against falling out of the bearing block.

To prevent relative movements and thus wear between the bearing block and the roller axle, complementary positive-locking structures can be formed between the roller axle and at least one of the recesses to prevent rotation.

The aforementioned handrail guide profile can already be provided with at least one of the roller arrangements described herein before it is installed in a balustrade of an escalator or moving walkway. Of course, handrail guide profiles of existing escalators or moving walkways can also be fitted with these roller arrangements, provided that these handrail guide profiles have at least one suitable groove.

In principle, the groove may only need to have two opposite walls, the distance between which can be matched to the locking element in the area provided. The cross-section of the groove can be of any shape, wherein a trapezoidal cross-section of the groove should not widen too much towards the open side of the groove, as vibrations during operation could cause a braced locking element to come loose. The design of the groove base of the groove arranged between the walls may be largely irrelevant; this can be a concave surface, a surface arranged at an angle to the walls and similar. However, grooves that have a rectangular cross-section can be particularly suitable.

BRIEF DESCRIPTION OF THE DRAWINGS

Embodiments of the present disclosure will be described below with reference to the accompanying drawings, wherein neither the drawings nor the description are intended to be interpreted as limiting the disclosure. Identical or equivalent features have the same reference signs. In the drawings.

The figures are merely schematic and not true to scale. In the different figures, identical reference signs denote identical or similar features.

DETAILED DESCRIPTION

Figure 1:
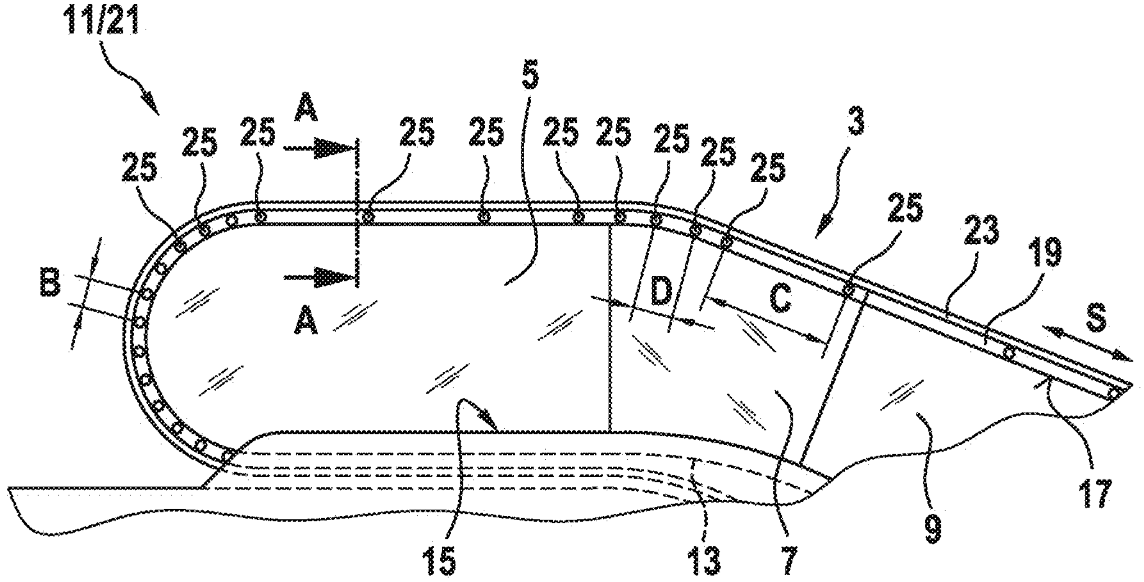
FIG. 1: shows a schematic side view of a portion of a balustrade of an escalator or moving walkway with a circumferentially movable handrail guided by a handrail guide profile, wherein roller arrangements embedded in the handrail guide profile are indicated.

FIG. 1 shows a schematic side view of a portion of a balustrade 3 of an escalator 11 or a moving walkway 21. The balustrade 3 has several balustrade panels 5, 7, 9, which are arranged one behind the other along the length of the escalator 11 or moving walkway 21. The balustrade panels 5, 7, 9 are firmly connected at their lower edge 13 to the other static components of the escalator 11 or moving walkway 21 with fastening devices not shown within a balustrade socket 15. A handrail guide profile 19 is arranged on further edges 17 of the balustrade panels 5, 7, 9, which guides a circumferentially movable handrail 23. Furthermore, a number of roller arrangements 25 are indicated in FIG. 1, which are distributed along a guide path S of the handrail guide profile 19 and are embedded in the handrail guide profile 19. In fact, for the sake of clarity, only the rollers 31 of the roller arrangements 25 (see FIGS. 2 and 3) are shown in normal line width. In fact, these parts, which are invisible from the outside, should be shown with a thin, broken line.

FIG. 1 also shows that the roller arrangements 25 can be arranged at different distances B, C, D from one another in the handrail guide profile 19. For example, where changes in direction of the handrail 23 and thus high compressive forces have to be supported on the handrail guide profile, the roller arrangements 25 are arranged closer together.

Figure 2:
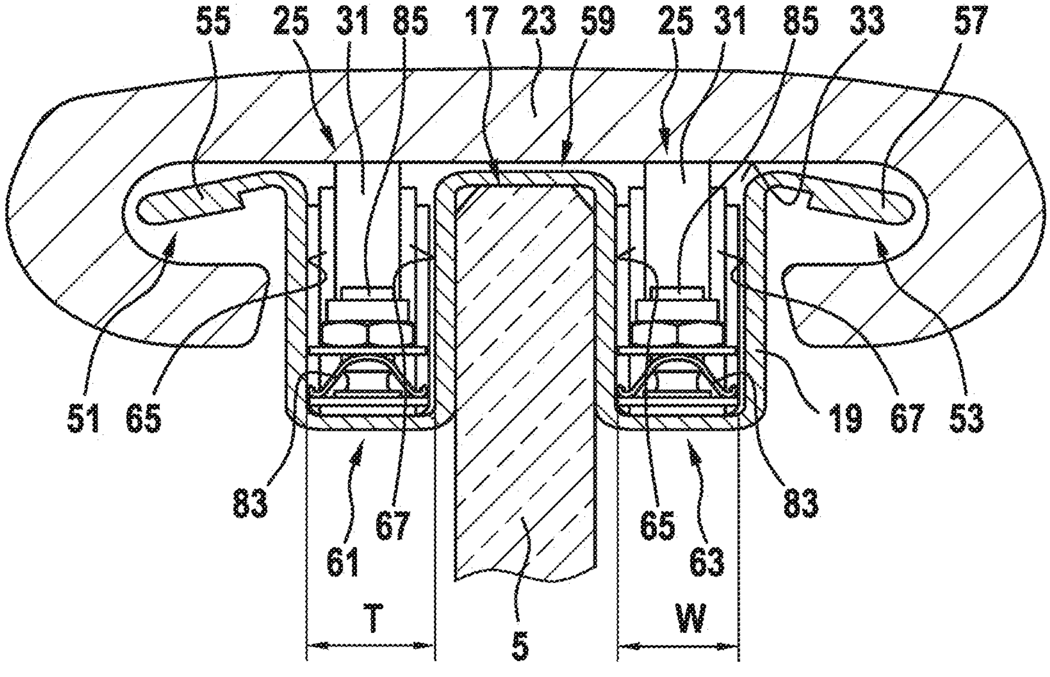
FIG. 2: shows an enlargement of the cross-section A-A through the handrail and the handrail guide profile shown in FIG. 1 with two roller arrangements arranged next to one another in a first embodiment.

FIG. 2 shows an enlargement of the cross-section A-A through the handrail 23 and the handrail guide profile 19 shown in FIG. 1. The handrail 23 has a C-shaped cross-section and is made of an elastic polymer material. The lateral guide grooves 51, 53 of the handrail 19 provided by the C-shaped cross-section surround laterally projecting ledges 55, 57 of the handrail guide profile 19 and thus form a sliding guide for the handrail 23, which can move relative to the handrail guide profile 19.

The handrail guide profile 19 has three grooves 59, 61, 63 arranged parallel to one another, which extend in the longitudinal direction of the handrail guide profile 19. The middle groove 59, designed as a plug-in connection, can be used for mounting the handrail guide profile 19 to the edge areas 17 of the balustrade panels 5, 7, 9. Roller arrangements 25 can be embedded in the other two grooves 61, 63. In the present disclosure, embedded means that the roller arrangement 25 is inserted into the groove 61, 63 and mounted therein in such a manner as to prevent displacement. Here, the roller 31 protrudes from the groove 61, 63 and distances an inner surface 33 of the handrail 23 resting on the rollers 31 from the strips 55, 57 of the handrail guide profile 19.

In cross-section A-A of FIG. 2, a roller arrangement 25 is embedded next to one another in each of the two outer grooves 61, 63. Such an arrangement in pairs is advantageous so that the handrail 23 is also supported in its width (orthogonal to the guide path S) by the roller arrangements 25.

Figure 3:
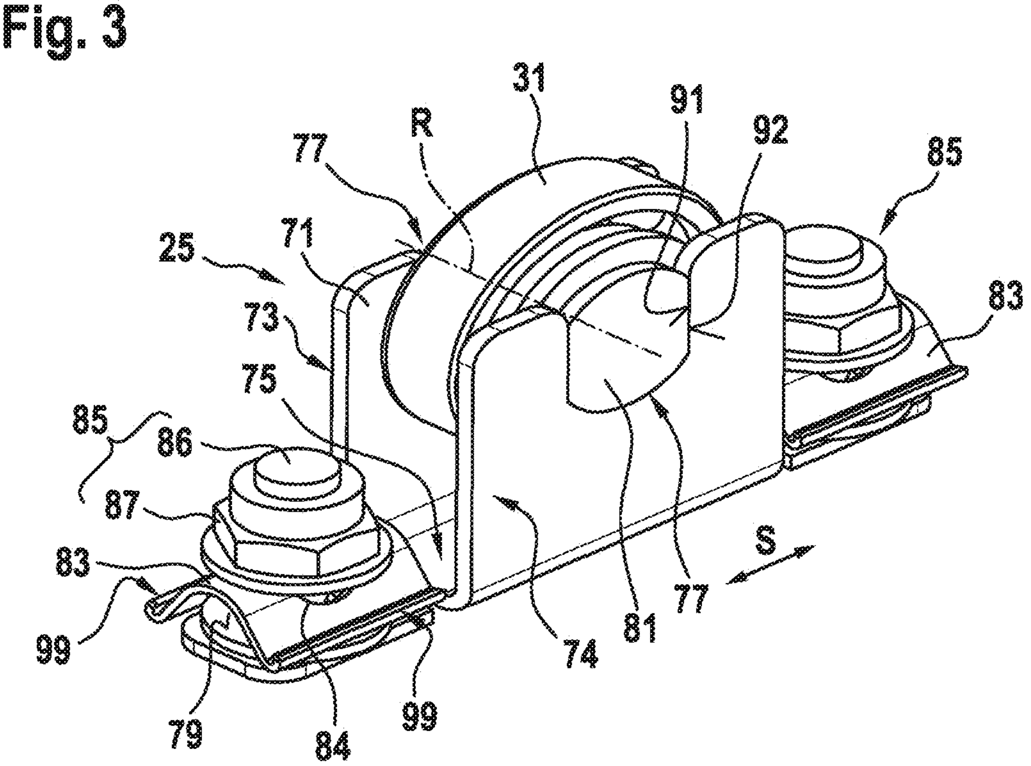
FIG. 3: shows a three-dimensional view of the roller arrangement shown in FIG. 2.

One of the two roller arrangements 25 shown in FIG. 2 is also shown in three-dimensional view in FIG. 3, which is why FIGS. 2 and 3 are described together below.

In a first embodiment, the roller arrangement 25 comprises a bearing block 71, a roller axle 81, a roller 31, two locking elements 83 and two clamping elements 85. A commercially available steel ball bearing is used as roller 31 in the present embodiment. Of course, other rollers 31 can also be used which, for example, have a plain bearing bush matched to the roller axle 81. The axis of rotation R of the roller 31 is arranged orthogonally to the guide path S of the handrail guide profile 19 (see also FIG. 1).

The bearing block 71 is designed as a bent sheet metal part and comprises two side cheeks 73, 74 with receptacles 77 for the roller axle 81 and a base structure 75 connecting the two side cheeks 73, 74. The bearing block 71 has a U-shaped cross-section formed by the side cheeks 73, 74 and the base structure 75, so that the roller 31 can be arranged between the two side cheeks 73, 74. The distance W between the two side cheeks 73, 74 is also matched to a groove width T of the opposing walls 65, 67 of the two outer grooves 61, 63, so that the bearing block 71 can be inserted into the groove 61, 63 with sufficient clearance.

The receptacles 77 formed in the side cheeks 73, 74 are U-shaped recesses. This allows the roller axle 81 together with the roller 31 to be easily inserted into the receptacles 77 or removed from the receptacles 77. This is still possible even if the bearing block 71 is embedded in a groove 61, 63.

The locking elements 83 and the clamping elements 85 can serve to mount the roller arrangement 25 in the groove 61, 63 of the handrail guide profile 19. A support surface 79 is formed on the base structure 75 of the bearing block 71 for each locking element 83. The locking element 83 is arranged on this support surface 79. The locking element 83 is a curved leaf spring element, wherein the curvature of the leaf spring element spans the support surface 79. A threaded bolt 86 is also arranged on the support surface 79, which projects vertically from the support surface 79 and projects through a bore 84 of the locking element 83. Furthermore, a self-locking threaded nut 87 is arranged on the threaded bolt 86, wherein the locking element 83 is arranged between the support surface 79 and the threaded nut 87. When the threaded nut 87 is now screwed against the support surface 79, the locking element 83 is increasingly pressed flat. This can change the width of the blocking element 83 with respect to the opposing walls 65, 67 of the groove 61, 63 until the areas of the blocking element 83 intended for contact with the walls 65, 67 of the groove 61, 63 abut against these. By further tightening the threaded nut 87, these areas can be braced against the walls 65, 67 of the groove 61, 63 with increasing force. The threaded bolt 86 and the threaded nut 87 thus form a clamping element 85 for the locking element 83.

To prevent the roller axle 81 from rotating in the receptacles 77, complementary structures 91, 92 in the form of surfaces are formed on the roller axle 81 and on the recesses 77. Together, these form a positive fit with respect to a rotary movement about the axis of rotation R and thus form an anti-rotation lock between the roller axle 81 and at least one recess 77.

Figure 4:
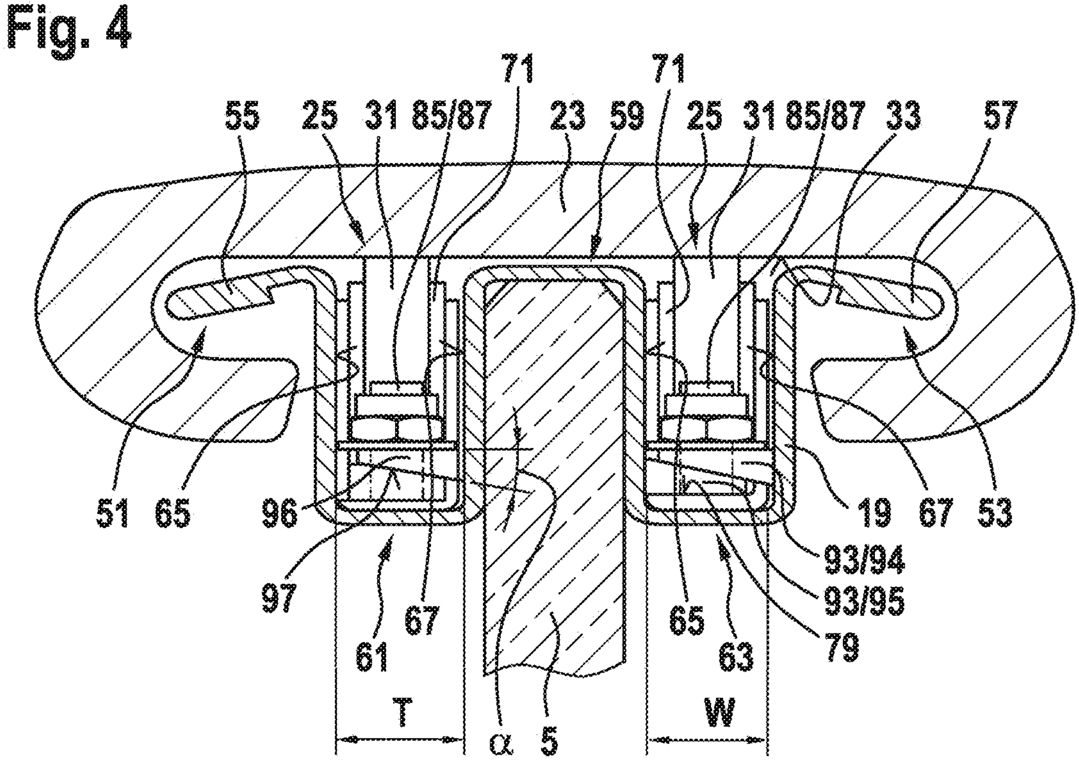
FIG. 4: shows an enlargement of the cross-section A-A through the handrail and the handrail guide profile shown in FIG. 1, with a roller arrangement in a second embodiment and with a roller arrangement in a third embodiment.

FIG. 4 shows an enlargement of the cross-section A-A through the handrail 23 and the handrail guide profile 19 indicated in FIG. 1 as well as a roller arrangement 25 in a second embodiment and a roller arrangement 25 in a third embodiment. The basic structure of the second and third embodiment substantially corresponds to the first embodiment. The two differ from the first embodiment only in the differently designed locking elements 93, 96.

The roller arrangement 25 of the second embodiment has a wedge-shaped locking element 96. Instead of a support surface 79, a wedge surface 97 is formed on the bearing block 71, on which the wedge-shaped locking element 96 is arranged for linear displacement. As can be seen from FIG. 4, a wedge angle α of the locking element 96 and the wedge surface 97 complement one another, so that the threaded nut 87 of the clamping element 85 can act flat on the wedge-shaped locking element 96. The wedge angle α should be greater than a resulting solid friction angle, which depends on the coefficients of friction between the threaded nut 87, the locking element 96 and the wedge surface 97. When the threaded nut 87 is tightened, the locking element 96 moves against one of the two walls 67 of the groove 61 and presses the opposite side of the bearing block 71 against the opposite wall 65 of the groove 61. As a result, the roller arrangement 25 is not embedded in the center of the groove 61.

In order to embed the roller arrangement 25 in the center, the third embodiment has a locking element 93 with two wedges 94, 95. As in the first embodiment, a support surface 79 is also formed here on the bearing block 71, on which the two wedges 94, 95 are arranged to complement one another in terms of inclination and to be linearly displaceable relative to one another. When the threaded nut 87 is tightened, one wedge 94 of the locking element 93 moves against one of the two walls 67 of the groove 63 and the other wedge 95 of the locking element 93 moves against the opposite wall 65 of the groove 63.

The areas of the previously described locking elements 83, 93, 96 intended for contact with the walls 65, 67 of the groove 61, 63 may have an embossed edge 99 (see FIG. 3). This embossed edge 99 partially digs into the material of the handrail guide profile 19 when the clamping element 85 is clamped, thereby creating a positive fit which secures the roller arrangement 25 even better against disengagement from the groove 61, 63 and/or against displacement in the groove 61, 63 along the guide path S.

Although a screw is always shown as clamping element 85 in FIGS. 2 to 4, it is apparent that for the present disclosure other clamping elements 85 such as toggle clamps, eccentric clamps and the like can be used to apply a force to the locking element 83, 93, 96 and to clamp it in the groove of the handrail guide profile 19. In addition, a roller arrangement 25 may also have more than one roller 31, which are rotatably mounted side by side on the same roller axle 81 or one behind the other on several roller axes 81 in the same bearing block 71.

Finally, it should be noted that terms such as "having," "comprising," etc., do not preclude other elements or steps, and terms such as "a" or "one" do not preclude a plurality. Reference signs in the claims should not be considered to be limiting.

The invention claimed is:

1. A roller arrangement configured to embed in a groove of a handrail guide profile of an escalator or a moving walkway comprising:

a bearing block comprising at least one locking element and at least one clamping element;

a roller comprising at least one roller axle configured to rotatably mount the roller in the bearing block, wherein the at least one clamping element is configured to clamp the at least one locking element between opposing walls of the groove when the roller arrangement is inserted into the groove.

2. The roller arrangement of claim 1, wherein the bearing block further comprises a support surface, wherein the at least one locking element is a curved leaf spring element arranged on the support surface, and wherein a curvature of the curved leaf spring element spans the support surface.

3. The roller arrangement of claim 1, wherein the bearing block further comprises a wedge surface, wherein the at least one locking element is configured as a wedge element arranged on the wedge surface such that it is linearly displaceable.

4. The roller arrangement of claim 1, wherein the bearing block further comprises a support surface, wherein the at least one locking element comprises two wedges arranged on the support surface such that they complement one another in inclination and are linearly displaceable relative to one another.

5. The roller arrangement of claim 1, wherein the at least one clamping element comprises a threaded bolt and a threaded nut.

6. The roller arrangement of claim 1, wherein areas of the at least one locking element configured to contact with walls of the groove comprise an embossed edge.

7. The roller arrangement of claim 5, wherein areas of the at least one locking element configured to contact with walls of the groove comprise an embossed edge.

8. The roller arrangement of claim 1, wherein the bearing block further comprises:

two side cheeks with receptacles configured to receive the at least one roller axle; and a base structure connecting the two side cheeks, wherein the bearing block has a U-shaped cross-section formed by the two side cheeks and the base structure.

9. The roller arrangement of claim 2, wherein the bearing block further comprises:

two side cheeks with receptacles configured to receive the at least one roller axle; and a base structure connecting the two side cheeks, wherein the bearing block has a U-shaped cross-section formed by the two side cheeks and the base structure.

10. The roller arrangement of claim 5, wherein the bearing block further comprises:

two side cheeks with receptacles configured to receive the at least one roller axle; and a base structure connecting the two side cheeks, wherein the bearing block has a U-shaped cross-section formed by the two side cheeks and the base structure.

11. The roller arrangement of claim 6, wherein the bearing block further comprises:

two side cheeks with receptacles configured to receive the at least one roller axle; and a base structure connecting the two side cheeks, wherein the bearing block has a U-shaped cross-section formed by the two side cheeks and the base structure.

12. The roller arrangement of claim 8, wherein the receptacles formed in the two side cheeks are U-shaped recesses.

13. The roller arrangement of claim 8, wherein complementary positive-locking structures are formed between the at least one roller axle and at least one recess to prevent rotation.

14. The roller arrangement of claim 12, wherein complementary positive-locking structures are formed between the at least one roller axle and at least one recess to prevent rotation.

15. The roller arrangement of claim 8, wherein the at least one locking element and the at least one clamping element associated with the at least one locking element are arranged on the base structure.

16. The roller arrangement of claim 12, wherein the at least one locking element and the at least one clamping element associated with the at least one locking element are arranged on the base structure.

17. A handrail guide profile having at least one roller arrangement of claim 1.

18. A handrail guide profile having at least one roller arrangement of claim 8.

19. An escalator or a moving walkway having at least one handrail guide profile of claim 17.

20. An escalator or a moving walkway having at least one handrail guide profile of claim 18.

* * * * *